Aug. 11, 1925.
C. H. GREGORIE
1,549,414
INSECTPROOF BREAD AND CAKE BOX
Filed May 20, 1922
2 Sheets-Sheet 1
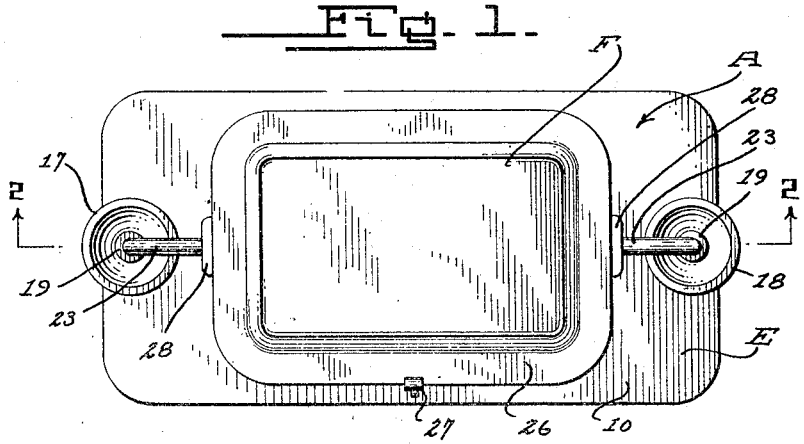
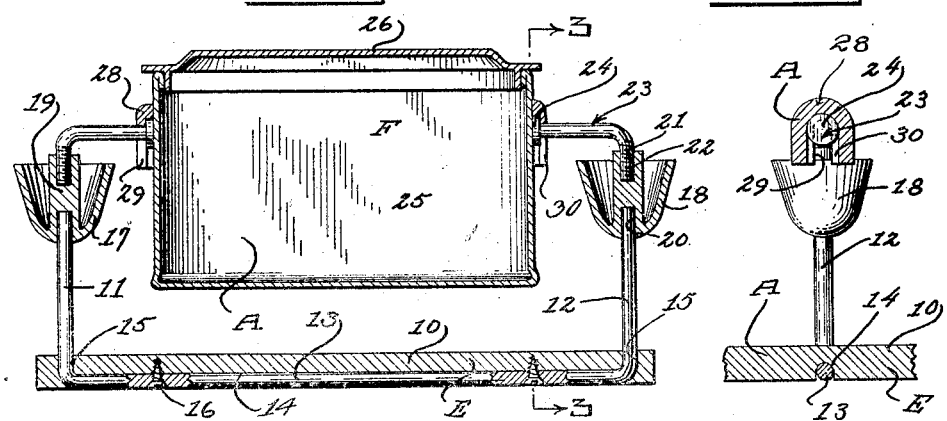
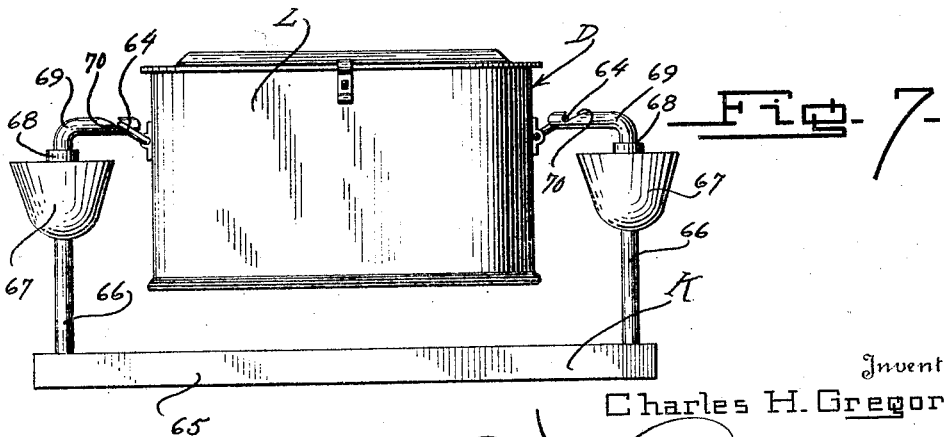
Inventor
Charles H. Gregorie Aug. 11, 1925.
C. H. GREGORIE
1,549,414
INSECTPROOF BREAD AND CAKE BOX
Filed May 20, 1922    2 Sheets-Sheet 2
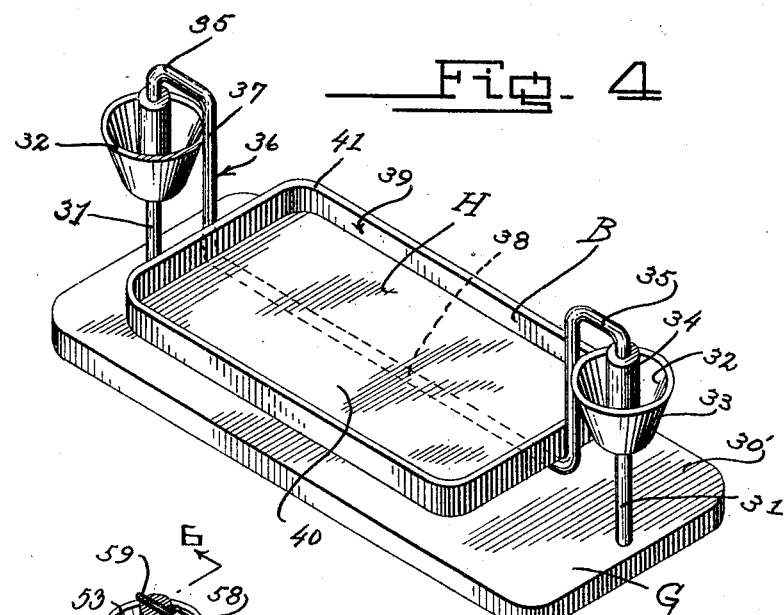
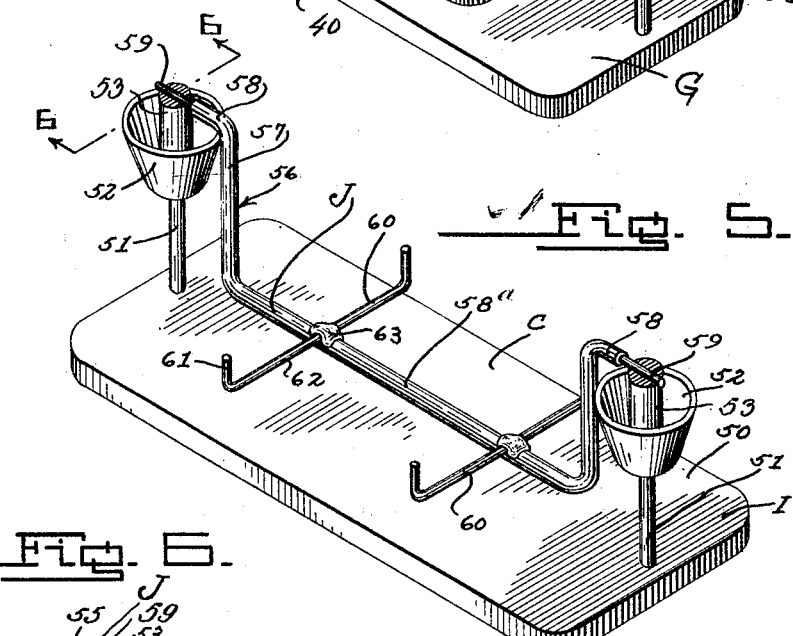
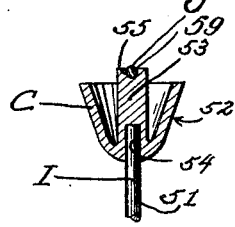
Inventor
Charles H. Gregorie Patented Aug. 11, 1925.

1,549,414

UNITED STATES PATENT OFFICE.

CHARLES HENRY GREGORIE, OF MACON, GEORGIA.

INSECTPROOF BREAD AND CAKE BOX.

Application filed May 20, 1922. Serial No. 562,396.

*To all whom it may concern:*

Be it known that I, CHARLES H. GREGORIE, a citizen of the United States, residing at Macon, in the county of Bibb and State of Georgia, have invented certain new and useful Improvements in Insectproof Bread and Cake Boxes, of which the following is a specification.

This invention relates to food receptacles, and the primary object of the invention is to provide a novel means for supporting a bread and cake box or other receptacle for effectively preventing insects, such as ants, from gaining access thereto.

Another object of the invention is the provision of supports for holding a bread or cake box having liquid holding receptacles, such as cups, associated therewith, to prevent the crawling of insects up the supports into the cake and bread box, the liquid receptacles being associated with the supports in a novel manner to permit the removal thereof, so that the easy and thorough washing and cleaning of the cups can be accomplished.

A further object of the invention is to provide a novel insect proof receptacle, which can be swung in relation to the supporting standards so as to permit ready access to be had to the interior of the box when it is desired to remove or replace articles therefrom or therein.

A still further object of the invention is to provide an improved insect proof cake and bread box of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a top plan view of one form of the improved insect proof bread and cake box.

Figure 2 is a central vertical longitudinal section through the improved insect proof bread and cake box taken on the line 2—2 of Figure 1.

Figure 3 is a fragmentary vertical transverse section through the improved box, taken on the line 3—3 of Figure 2.

Figure 4 is a perspective view of another form of the invention which is adapted to receive an ordinary type of bread and cake box.

Figure 5 is a perspective view of a further form of the invention which is also adapted to receive an ordinary type of bread and cake box or other receptacle, which is to be protected from insects.

Figure 6 is a fragmentary vertical sectional view, taken on the line 6—6 of Figure 5.

Figure 7 is a front elevation of a further form of the invention showing the means for associating an ordinary bread and cake box with the novel insect guarding device.

Referring to the drawings in detail, wherein similar reference characters designate corresponding parts, throughout the several views, the letter A generally indicates the form of the invention shown in Figures 1 to 3 inclusive; B, the form of the invention shown in Figure 4; C, the form of the invention shown in Figures 5 and 6 of the drawings; and D, the form of the invention shown in Figure 7 of the drawings.

The improved insect proof device, designated by the reference character A, includes primarily the frame E, and the receptacle proper F.

The frame E includes a flat base plate 10 of the desired size and configuration which can be made of any preferred material, such as metal or wood. This base plate can support, at the opposite terminals thereof and at its longitudinal center, upstanding standards 11 and 12. These standards 11 and 12 are secured to the base plate 10 in any preferred manner, and by way of example, these standards 11 and 12 are connected by an integral horizontal connecting portion 13. The base plate 10 at its longitudinal center has the lower face thereof grooved, as at 14, for the connecting rod 13. Openings 15 are formed in the base plate 10, at the terminals of the groove 14, and the standards 11 and 12 are adapted to protrude through said openings. The connecting portion or rod 13 is secured in place in the groove 14 against turning movement by suitable fastening elements, such as screws 16. The standards 11 and 12 and the connecting portion or rod 13 forms a substantially U-shaped member in elevation, as can be clearly seen in Figure 2 of the drawings. The upper terminals of the standards are preferably left smooth and have associated therewith liquid receiving cups 17 and 18. These cups can be formed of any preferred material, such as metal, suitably treated to prevent rusting and corroding, and these cups 17 and 18 gradually flare outwardly from their lower terminals. Each cup at its axial center is provided with an upstanding stud 19. This stud 19 is extended above the upper end of each cup. The lower terminals of the cups 17 and 18 and the studs 19 have sockets 20 formed therein for receiving the smooth upper terminals of the standards 11 and 12. These cups are freely removable from the standards to permit the easy and thorough cleaning thereof. To remove the cups, it is merely necessary to pull upwardly on the same. The upper terminals of the studs 19 are provided with internally threaded sockets 21, in which are adapted to be threaded, the vertically disposed threaded portions 22 of the L-shaped supporting arms 23. These arms 23 are also freely removable from the cups. The inner free terminals of the horizontally disposed portions of the L-shaped arms 23 are provided with disc shaped heads 24, for a purpose which will hereinafter more fully appear.

The receptacle F may be of any preferred character, and put to any preferred use. This receptacle has been shown by way of example to be a bread and cake box, and consists of a body 25 which has a hinged cover 26 which may be held in its closed position by a suitable hasp 27. The end walls of the receptacle F are provided with sockets 28 for removably receiving the heads 24 formed on the L-shaped arms 23. These sockets 28 form an efficient means for permitting the oscillatory connection of the receptacle F with said arms, and the said connection permits the box to be turned on said arms 23, so that the interior of the box can be readily exposed when so desired, to permit the easy placing and removing of articles therefrom. The sockets 28 include a vertically extending way 29 for the arms 23, and this way 29 is defined by inwardly extending flanges 30 which form a partial housing for the heads 24. As stated, these sockets permit the oscillatory movement of the receptacle F thereon.

In use of the improved insect-proof device, when liquid is placed within the cup 17 and 18, it is obvious that insects crawling up the standards 11 and 12 will not be able to crawl up the arms 23 to the receptacle, in view of the liquid contained within the cups 17 and 18. When it is desired to clean the cups 17 and 18, it is merely necessary to pull up on the receptacle F, which will move the sockets 28 above the heads 24. After removing the box or receptacle F, the L-shaped arms 23 can be removed from the cups 17 and 18, if so desired, and a slight pull upward on the cups will remove the same from the arms or standards 11 and 12. The cups can now be thoroughly and easily cleaned.

The form B of the invention is particularly adaptable for receiving an ordinary type of bread and cake box now on the market, without the necessity of making any change thereto whatsoever, and includes the supporting frame G, and a cradle H for receiving the bread and cake box. While I have stated that the cradle H is particularly adapted to receive a bread and cake box, it is to be understood that any receptacle can be associated therewith that may be desired.

The frame G includes a flat base plate 30' of the desired size and configuration, which supports adjacent the opposite terminals thereof and at the longitudinal center thereof, the upstanding standards 31. These standards 31 may be associated with the base 30' in the same manner as the standards 11 and 12 with the base 10. The upper terminals of the standards 31 may removably support cups 32 in the same manner as the standards 11 and 12 support the cups 17 and 18. These cups 32 are also constructed in the same manner as the cups 17 and 18, and each consists of a flared body 33 and the axially disposed stud 34, which is adapted to receive the inwardly extending L-shaped arms 35. These arms 35 have their vertically disposed portions removably fitted in the studs 34 in the same manner as the arms 23. The horizontally disposed portion of the L-shaped arms 35 support a substantially U-shaped member 36, which consists of upstanding legs 37 and the horizontally disposed connecting or bight portion 38. A tray 39 is secured in any preferred manner, such as by riveting or welding, to the connecting portion 38 of the U-shaped member 36. This tray 39 includes essentially a flat plate 40, and upstanding marginal flange 41 which prevents the displacement of the receptacle placed thereon.

It can be seen that ants or other crawling insects will be prevented from gaining access to a receptacle placed upon the tray 39 in view of the fact that the insects will be prevented from crawling to the L-shaped arms 35 by the liquid placed in the cups 32. These cups, of course, can be easily cleaned, by removing the same from the standards 31 in the same manner as heretofore described for cups 17 and 18.

The form of my invention shown in Figures 5 and 6 of the drawings and indicated by the reference character C is also adapted to receive bread and cake boxes of the ordinary structure, without any change therein, and includes the supporting frame I and the swinging cradle J. The frame I consists of a flat base plate 50, formed of any preferred material, such as wood, and the upstanding standards 51 which may be secured to the base plate 50 in the same manner as the standards 11 and 12. The upper terminals of these standards 51 removably support the liquid receiving cups 52 of the same construction as the cups 17, 18 and 32. These cups 52 have formed integral therewith the upstanding studs 53, which are provided at their lower ends with the sockets 54 for the reception of the standards 51. The upper ends of the studs 53 are provided with grooves 55, forming bearings, for a purpose which will be hereinafter more fully described.

The swinging cradle J includes a substantially U-shaped supporting member 56, having the upstanding legs 57 and the connecting rod or portion 58$^a$. This connecting portion 58$^a$ and the legs 57 are disposed at the longitudinal center of the base plate 50, and outwardly extending arms 58 are formed on the terminals of the legs 57. These arms 58 are preferably reduced in diameter, at their terminals, to provide bearing pins 59, which removably and rockably fit within the bearings or grooves 55. The connecting portion 58$^a$ has secured thereto at spaced points, the brackets 60, which are also of substantially U-shaped construction, including the upstanding legs 61 and the connecting portion 62. The brackets 60 may be secured to the connecting portion 58$^a$ of the U-shaped member 56, in any preferred manner, such as by solder 63. The bread and cake box or other receptacle, is of course, adapted to be placed upon the brackets 60 and insects are prevented from gaining access to the receptacle in view of the fact that the same cannot pass the cups 52. The swinging cradle J permits the receptacle to be tilted, in order to permit free access to be gained to the interior thereof. The cups 52 can, of course, be easily washed, by removing the same from the upper ends of the standards 51.

In Figure 7 is shown a further modified form as indicated by the reference character D for supporting a bread or cake box of the ordinary construction. This form includes a support or frame K, and has associated therewith the bread box L which can be of the ordinary or any preferred construction. The bread box L, as shown, has secured thereto at the end wall portions thereof swinging bail handles 64.

The novel supporting frame comprises a base plate 65, which can be formed similar to the base plates 10, 30' and 50, and this base plate 65 supports the upstanding standards 66, which may be secured thereto in the same manner as the standards 11 and 12 are secured to the base plate 10. The upper terminals of these standards support cups 67 for the reception of some suitable liquid, and these cups are of the same construction as the cups 17 and 18, and are removably associated with the standards 66. These cups also have formed therein at the axial centers thereof, the upstanding studs 68, which removably support the L-shaped arms 69. The horizontally disposed portions of the arms 69 have their upper surfaces grooved, as at 70, for the reception of the handles 64 of the bread and cake box L, and it can be seen that access is prevented to the box L by insects, by means of the cups 67. The bread box, of course, can be easily removed from the L-shaped arms 69 if so desired. The easy washing of the cups 67 is also permitted, as these cups can be readily removed from the standards 66, when so desired.

From the foregoing description, it can be seen that an improved means has been provided for supporting a bread and cake box or other receptacle which absolutely prevents the entrance of crawling insects, such as ants therein. The support also permits the bread box to be tilted, so that easy access can be gained to the interior thereof to permit articles to be placed therein or withdrawn therefrom.

Changes in details may be made without departing from the spirit or scope of this invention; but,

I claim:

1. A device for supporting receptacles and the like to prevent access of crawling insects thereto comprising a base, standards upstanding upon said base, liquid receiving cups having sockets upwardly therein for detachably receiving the upper ends of said standards, upstanding studs formed rigid within said cups, and means associated with said studs for rockably supporting a receptacle between said cups.

2. In an insect proof device, a base plate, upstanding standards carried by the base plate, liquid receiving cups removably associated with the standards, studs disposed upwardly from within said cups, a U-shaped supporting rod, arms formed on the terminals of the U-shaped supporting rod arranged to detachably fit in said studs, and supporting means carried by said U-shaped supporting rod between the standards.

3. A device for preventing crawling insects from gaining access to an article comprising a support, spaced standards carried by said support, cups carried by said standards upwardly of said support, studs extending from within said cups and means supported by said studs for oscillatively supporting an article intermediate said cups.

4. In a device for supporting receptacles and the like to prevent access of crawling insects thereto the combination of a supporting base, standards carried in spaced relation by said base, cups carried at the upper ends of said standards, studs extending upwardly from within said cups in a rigid relation therewith, and a U-shaped article supporting frame including laterally extending reduced spindles bearing in said studs in a rocking relation therein.

CHARLES HENRY GREGORIE.